United States Patent [19]

Read

[11] 4,022,173
[45] May 10, 1977

[54] CROSS-FLOW VAPORIZER

[76] Inventor: Frank E. Read, 702 Vardo Lane, Lubbock, Tex. 79403

[22] Filed: Aug. 11, 1975

[21] Appl. No.: 603,589

[52] U.S. Cl. .......................... 123/122 E; 123/133; 165/52

[51] Int. Cl.² ........................................ F02M 31/00

[58] Field of Search .... 123/122 E, 122 A, 122 AB, 123/133; 165/52; 261/145

[56] References Cited

UNITED STATES PATENTS

| | | | |
|---|---|---|---|
| 1,603,660 | 10/1926 | Cassella | 123/133 |
| 1,763,450 | 6/1930 | Deventer | 123/122 A |
| 3,253,647 | 5/1966 | DeShaies | 123/122 E |
| 3,855,980 | 12/1974 | Weisz | 123/122 E |

FOREIGN PATENTS OR APPLICATIONS

| | | | |
|---|---|---|---|
| 1,191,520 | 10/1959 | France | 123/122 E |
| 168,793 | 9/1921 | United Kingdom | 123/133 |

*Primary Examiner*—Ronald H. Lazarus
*Attorney, Agent, or Firm*—Wendell Coffee

[57] ABSTRACT

A fuel vaporization chamber is used to vaporize fuel and mix the fuel vapors with air. Fuel impinges against an exhaust-heated wall and the vapors are mixed with the air in a cross-flow pattern. Unvaporized fuel drains from the bottom of the vaporizer to a reservoir.

17 Claims, 5 Drawing Figures

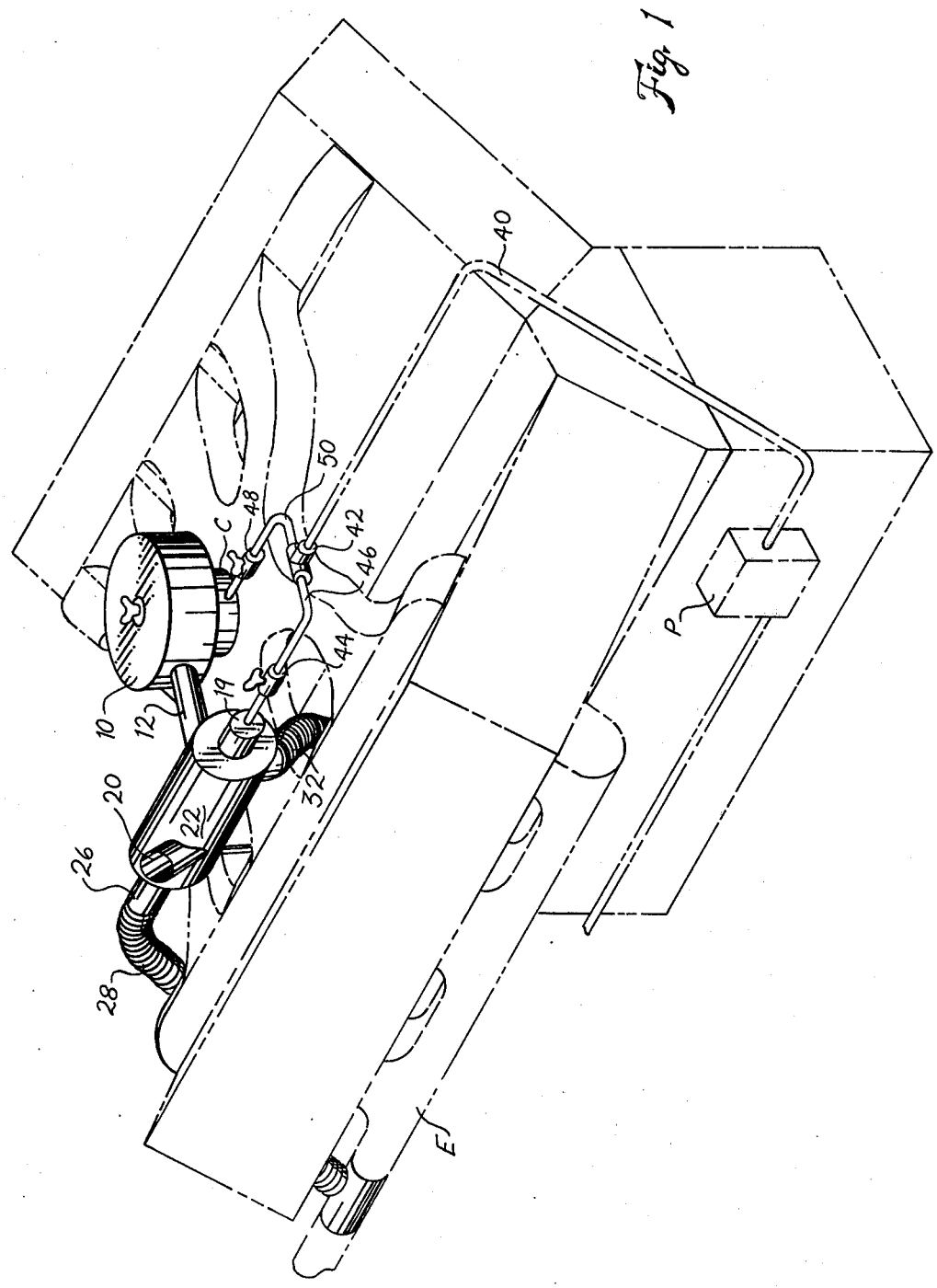

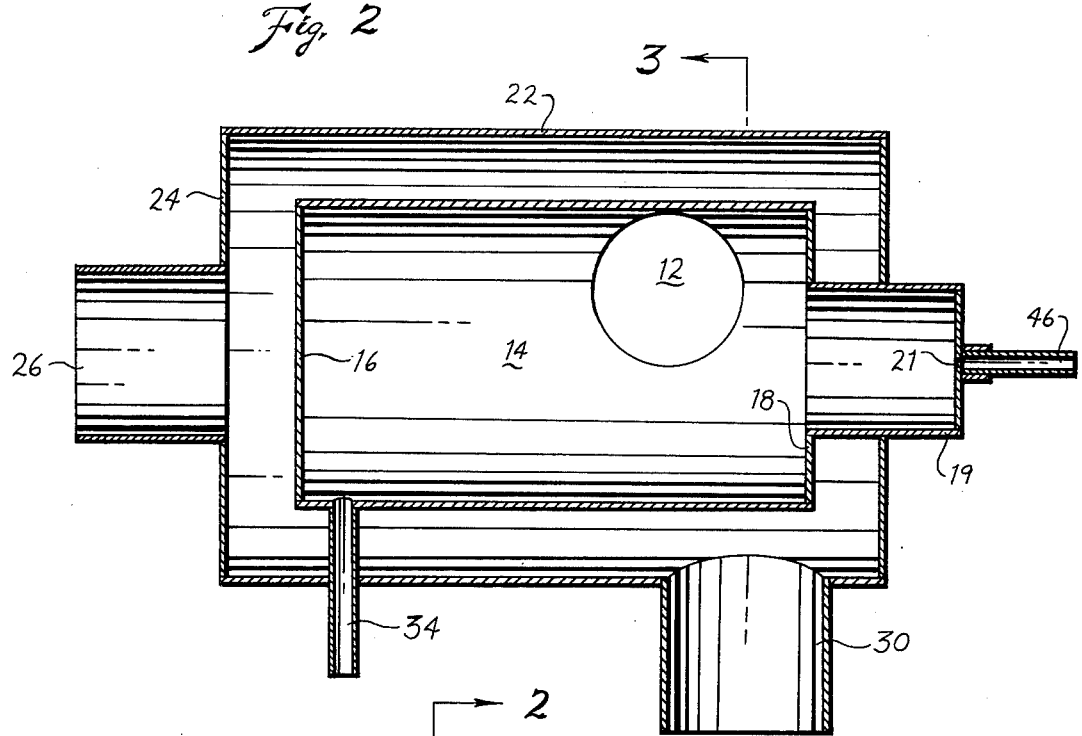
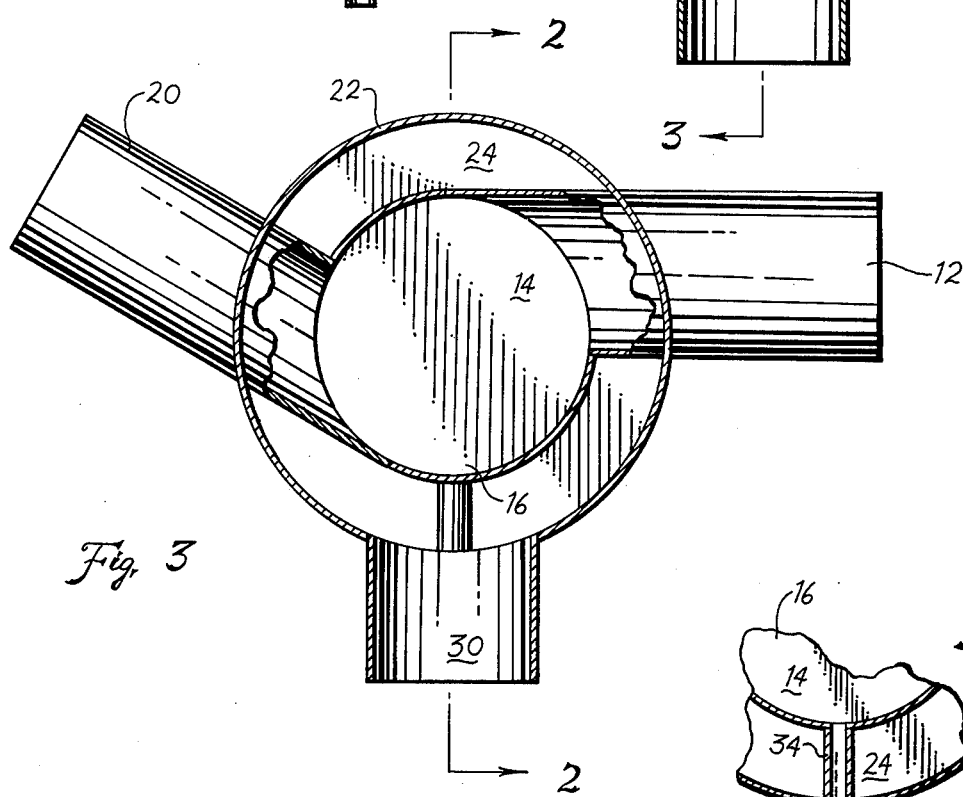
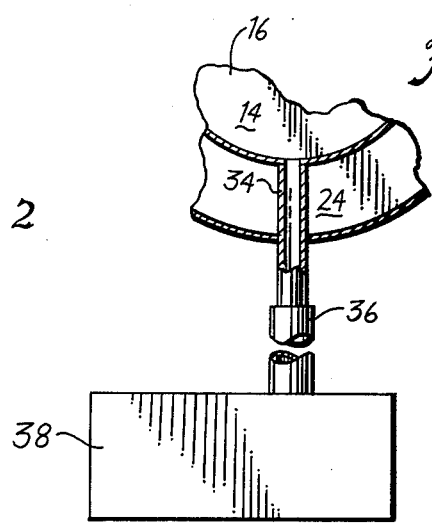

CROSS-FLOW VAPORIZER

BACKGROUND OF THE INVENTION

1. Field of the Invention

This invention relates to vaporizing liquid fuels and mixing air with the vaporized fuel for spark ignition in an internal combustion engine.

2. Description of the Prior Art

One of the great commercial uses today of spark ignition internal combustion engines is a power source for automobiles. In recent times increased emphasis has been placed upon improving the economy of these engines. I.e., to improve the miles per gallon of gas obtained by the automobile. Many of the engines today are of high displacement and, therefore, are high powered, being designed for speeds higher than allowed today. As a consequence their fuel consumption is also high; therefore, the desirability of lowering fuel consumption has greatly increased. The common method of the mixture of the fuel and air is to inject the liquid fuel as a spray in the ambient temperature air stream and flowing the liquid fuel along the interior walls of the intake manifold to the intake valves of the engine from which there is an uneven flow of fuel into the cylinders of the engine. Although a great deal of design has been made as to the construction and shape of the intake manifold, there is still an uneven flow of liquid fuel into the various cylinders.

SUMMARY OF THE INVENTION

1. New and Different Function

I have discovered that a thorough vaporization of the liquid fuel together with a thorough mixture of the vaporized fuel with air while preheating both greatly improves the efficiency and economy of the engine. I do not claim to increase the power of the engine, in fact, it is well known that preheating the air before it enters the engine has a tendency to reduce the total output of the engine. However, as stated before, most of the automobiles on the road today have far more powerful engines than are required for present day speed limits, but I have found that having the fuel and air thoroughly mixed in a cross-flow vaporization chamber, a more homogeneous mixture of fuel and air may be fed to the cylinders. The cross-flow is achieved by having the air enter the vaporization chamber tangentially on one side and the air vapor mixture leave the vaporization chamber tangentially on the other side so the fuel and air must cross and reverse flow to leave the chamber, resulting in thorough mixing.

2. Objects of this Invention

An object of this invention is to vaporize fuel for a spark ignition internal combustion engine.

Another object is to vaporize fuel and mix the vaporized fuel with air for a spark ignition internal combustion engine.

Other objects are to achieve the above and also to preheat the mixture.

Further objects are to achieve the above with a device that is sturdy, compact, durable, lightweight, simple, safe, efficient, and reliable, yet inexpensive and easy to manufacture, install, operate, and maintain.

Still further objects are to achieve the above with a method that is versatile, rapid, efficient, and inexpensive, and does not require skilled people to install, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a perspective view of a conventional spark ignition internal combustion automobile engine schematically represented with an embodiment of my invention attached thereto.

FIG. 2 is a axial, sectional view of the jacketed vaporization chamber according to my invention taken substantially on line 2—2 of FIG. 3.

FIG. 3 is a cross sectional view of the vaporizer taken substantially on line 3—3 of FIG. 2.

FIG. 4 is a detail taken substantially on line 4—4 of FIG. 2.

DESCRIPTION OF THE PREFERRED EMBODIMENT

Figure 5:
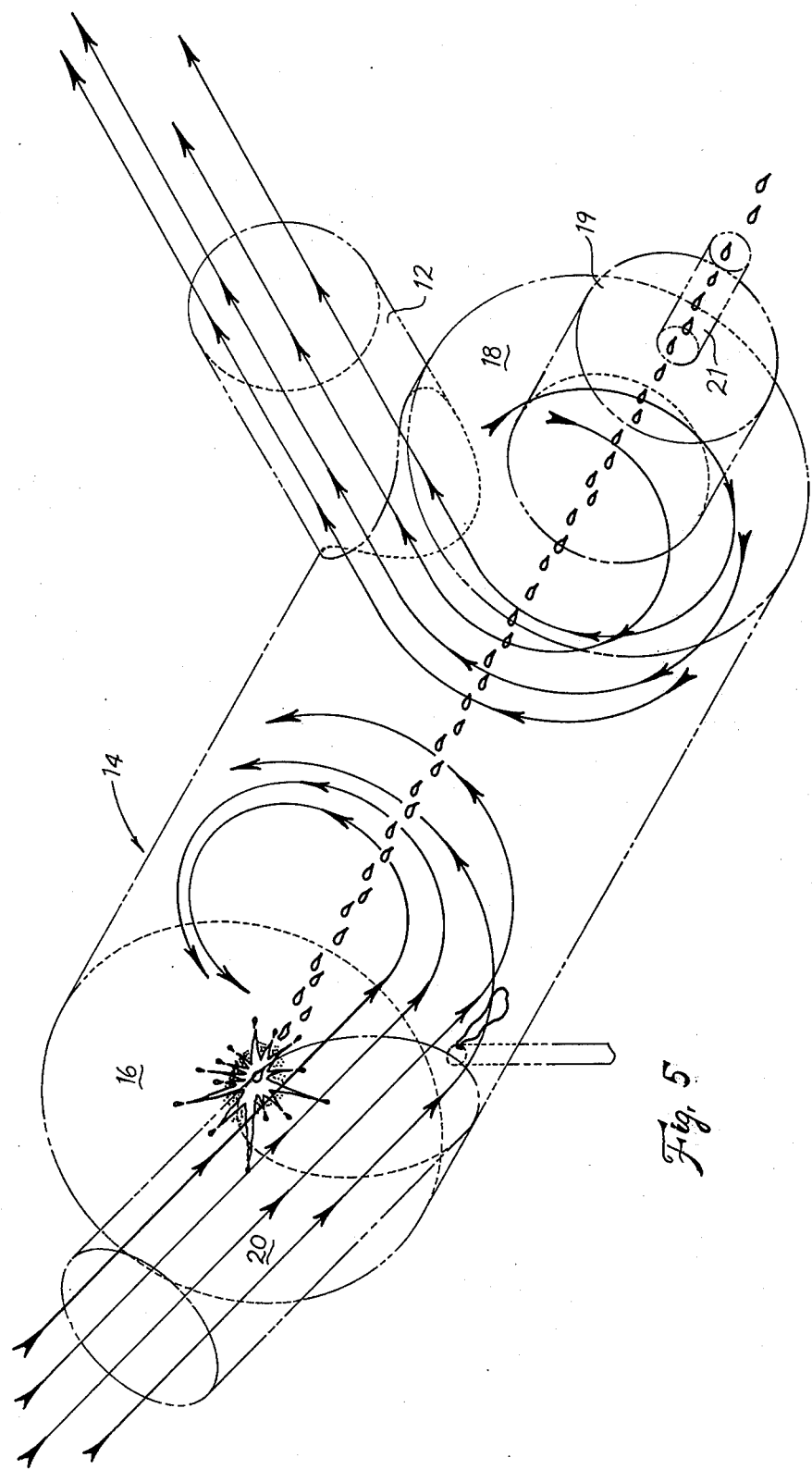
FIG. 5 is a schematic representation showing the cross flow of the fuel and air within the vaporization chamber.

Referring more particularly to the drawing, this invention is designed to attach to a conventional automobile engine. The conventional engine will have a carburetor "C" with fuel pump "P" to provide fuel to the carburetor. Also, the engine will have exhaust manifold "E" and exhaust tail pipe (not shown).

My vaporizer is attached to the engine. The jacketed vaporizer chamber is mounted on the engine adjacent to the carburetor. Inasmuch as the brackets by which it is structurally supported would be within the skill of ordinary automobile mechanics, the same has not been illustrated nor described.

The air filter of the carburetor is removed and carburetor cap 10 is fitted thereover. The cap 10 is connected to the vaporizer by vapor outlet pipe 12.

Referring more particularly to FIGS. 2 and 3, there may be seen that the vapor outlet pipe 12 is connected to vaporization chamber 14 itself. The vaporization chamber 14 is a circular cylinder having a solid hot end in the form of plate 16 and having inlet end 18. I have had good success using a vaporization chamber of about 10 cm in diameter and about 18 cm in length. The vapor outlet 12 being 5 cm in diameter with the axis intercepting the cylinder 2.5 cm above the axis of the vaporization chamber. The top of the vapor outlet pipe 12 is tangent to the top of the vaporization chamber 14. Also, I have had good success having the axis of the vapor outlet pipe located about 3.5 cm from the inlet end 18. Therefore, it may be seen that the vapor outlet pipe 12 is proximate or near the inlet end 18.

Referring more particularly to FIG. 3, air intake 20 enters the side of the vaporization chamber. The air intake 20 is about 6 cm in diameter and the axis angles up about 30°. The axis also intersects the cylinder about 2 cm below the cylinder axis. Therefore, the bottom of the intake is about tangent with the bottom of the vaporization chamber. Also, the axis of the intake is about 3.5 cm from the hot end 16, so, it may be seen that the inlet is near or proximate the hot end. From an analysis of the figures given, it may be seen that the axis of the intake is about 11 cm from the axis of the outlet. Therefore, referring particularly to FIG. 5, it may be seen that the intake comes in at one tangent and the outlet exits at another tangent; therefore, there will be considerable turbulence of the flow of air through the vaporization chamber. I.e., the air entering through the air intake 20 will come in at a tangent and will tend to cause a rotation of air in a counterclockwise direction as seen in FIG. 3. However, the air will be removed from the vaporization chamber through the outlet which on another tangent and, therefore, it will tend to be removed in another direction, namely, a clockwise direction. In addition to this, the axes of the two are offset so there will be considerable turbulence or cross flow.

In addition to the cross flow caused by this, the fuel enters through the inlet end 18 through cylindrical extension 19 about 6 cm diameter, which is concentric with the vaporization chamber and also 6 cm in length. The fuel enters axially through this extension through fuel opening 21 about 1.5 mm in diameter. As may be seen and understood from the description, the fuel enters and is directed toward the hot end 16 of the vaporization chamber 14. The air flow tends to be circular or rotary, whereas the fuel flow is axial. This results also in cross flow so there is excellent mixing of the fuel and the air. The fuel, of course, because of its inertia, tends to impinge against the hot wall or end 16, which is heated as will be explained later. Therefore, if any of the fuel is still in liquid form, it would be expected to vaporize and the vapors mixed thoroughly with the air as it exits through the vapor outlet 12 to the carburetor "C".

The vaporization chamber 14 is jacketed in heat chamber 22. I have had good success using a jacket 15 cm in diameter and about 23 cm in length. Hot end 24 of the jacket will be located about 2.5 cm from the end of the chamber and the inlet end 18 of the vaporization chamber will be located 2.5 cm from the other end of the jacket. The hot end 24 of the jacket has exhaust inlet pipe 26 about 6 cm in diameter coaxially therewith. Inasmuch as the jacket is coaxial with the chamber, the heat inlet 26 would be coaxial with the jacket 22, with the vaporization chamber 14, and with the vaporization chamber extension 19 and with the fuel opening 21.

The heat inlet 26 is attached to the exhaust manifold "E" of the automobile by exhaust flexible pipe 28. Radially extending from the bottom of the jacket and near the inlet end of the vaporization chamber 14 is exhaust outlet 30, also having a diameter of about 6 cm. It is connected to the tail pipe of the automobile by flexible pipe 32. Therefore, it may be seen that an engine with the hot exhaust gasses flowing through the manifold, the vaporization chamber will be heated and particularly the hot end 16 having the exhaust gasses impinging thereon. The benefit of this has been discussed earlier because of the fuel being directed against this hot end.

Liquid fuel drain 34, as illustrated, extends radially from the cylinder about 2 cm from the hot end 16. Therefore, if there is any fuel not vaporized in the vaporization chamber, it will flow from the chamber through the fuel drain 34. The fuel drain is connected by suitable tubing 36 to fuel reservoir 38. The fuel reservoir 38 is located at a lower point than the vaporization chamber and, therefore, the fuel drains by gravity into the reservoir 38.

Fuel line 40 from the fuel pump "P" of the engine is cut and one leg of tee 42 is attached to the fuel line 40 as seen in FIG. 1. Vaporizer valve 44 is attached into another leg of the tee 42 and attached by vaporizer conduit 46 to the fuel inlet 21 in the inlet extension 19 of the vaporizer. From the third leg of the tee 42, carburetor valve 48 is connected. Carburetor conduit 50 extends from the carburetor valve 48 to the carburetor of the engine. It will be understood, of course that the conduit 50 and the fuel line 40 could be the original fuel line from the pump to the carburetor.

The normal mode of operation is to close the vaporizer valve 44 and open the carburetor valve 48 so there is a flow of fuel from the fuel pump to the carburetor. In this condition, the engine is started and operated for two to 5 minutes until it warms up. At that time, the valve 48 is closed and the valve 44 (a needle valve) opened so the engine in this mode operates through the vaporizer. As stated before, there will be a thorough mixture of the fuel with the air as well as preheating the air and vaporizing the fuel.

Those skilled in the art will understand that some persons using the invention would desire to put a venturi at the inlet extension 19 with a fuel spray from a float tank therein so there was a metering of the fuel according to the amount of air pulled into the intake manifold of the engine.

Also, the inlet extension 19 can be extended internally to within 5 cm of the hot end 16. This results in better direction of the liquid fuel against the hot end 16. Also, better circulation within the vaporization chamber 14 results. The extension 19 could be a semi-cylinder (open on the bottom) within the vaporization chamber. Furthermore, baffles around the air intake and vapor outlet could be used to direct the flow within the chamber 14.

As an aid to correlating the terms of the claims to the exemplary drawing, the following catalog of elements is provided:

| | |
|---|---|
| 10 cap | 30 exhaust outlet |
| 12 vapor outlet | 32 flexible pipe |
| 14 vaporization chamber | 34 fuel drain |
| 16 hot end, chamber | 36 tubing |
| 18 inlet end | 38 reservoir |
| 19 extendion | 40 fuel line |
| 20 air intake | 42 tee |
| 21 fuel opening | 44 valve, vaporizer |
| 22 jacket | 46 vaporizer conduit |
| 24 hot end, jacket | 48 carburetor valve |
| 26 heat inlet | 50 carburetor conduit |
| 28 exhaust flexible pipe | |
| | C — carburetor |
| | P — fuel pump |
| | E — exhaust manifold |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A fuel vaporizer for a spark ignition internal combustion engine comprising:
    a. a cylindrical horizontal vaporization chamber, said chamber having
        i. an inlet end and
        ii. a hot end, b. a liquid fuel opening into the vaporization chamber axially aligned with the chamber at the inlet end,
c. a cylindrical jacket around the vaporization chamber,
d. said jacket having an exhaust heat inlet therein directed toward the axis of the hot end of the vaporization chamber,
e. said jacket having an exhaust outlet therefrom
f. a liquid drain from the vaporization chamber at a low point therein,
g. a cylindrical vapor outlet pipe whose top extends tangentially from the top of the vaporization chamber
h. the axis of the outlet pipe being above the axis of the vaporization chamber, and
i. a cylindrical air intake pipe whose bottom extends tangentially from the vaporization chamber.

2. The invention as defined in claim 1 wherein
j. said vaporizer is connected to said internal combustion engine,
k. said vapor outlet pipe connected to a carburetor on the internal combustion engine in lieu of the air filter,
m. the exhaust heat inlet connected to an exhaust outlet from said internal combustion engine,
n. said exhaust outlet from the jacket connected to a tail pipe of the internal combustion engine,
o. the liquid drain connected to a fuel reservoir, and
p. the liquid fuel inlet connected by conduit to a fuel pump on the internal combustion engine.

3. The invention as defined in claim 2 with additional limitations of
q. a tee in the conduit from the fuel pump to the fuel inlet of the vaporization chamber,
r. a valve in the conduit from the tee to the vaporization chamber, and
s. a conduit from the tee to the carburetor, and
t. a valve in a conduit from the tee to the carburetor.

4. The invention as defined in claim 1 with an additional limitation of
j. said liquid drain being proximate the hot end of the vaporization chamber.

5. The invention as defined in claim 1 with an additional limitation of
j. said exhaust outlet extending radially from said jacket near the inlet end of said vaporization chamber.

6. The invention as defined in claim 1 with an additional limitation of
j. said jacket concentric with said vaporization chamber.

7. The invention as defined in claim 6 with an additional limitation of
k. said exhaust inlet concentric with said vaporization chamber.

8. The invention as defined in claim 1 with an additional limitation of
k. said cylindrical air intake pipe having its axis below the axis of the vaporization chamber.

9. The invention as defined in claim 8 with additional limitations of
m. said air intake pipe closer to the hot end than the inlet end and on the opposite side from the vapor outlet,
n. said vapor outlet pipe being nearer the inlet end than the hot end.

10. The invention as defined in claim 9 with an additional limitation of
o. said liquid drain being proximate the hot end of the vaporization chamber.

11. The invention as defined in claim 10 with an additional limitation of
p. said exhaust outlet extending radially from said jacket near the inlet end of said vaporization chamber.

12. The invention as defined in claim 11 with an additional limitation of
q. said jacket concentric with said vaporization chamber.

13. The invention as defined in claim 12 with an additional limitation of
r. said exhaust inlet concentric with said vaporization chamber.

14. In a spark ignition internal combustion engine having
a. a carburetor,
b. a fuel pump to pump fuel to the carburetor, and
c. an exhaust manifold;
d. the improved fuel vaporizer in combination with the above comprising:
e. a cylindrical, horizontal vaporization chamber having
  i. an inlet end and
  ii. a hot end,
f. a liquid fuel opening into the vaporization chamber axially aligned with the chamber at the inlet end,
g. a conduit extending from the fuel pump to the fuel opening to provide fuel thereto,
h. a cylindrical jacket around the vaporization chamber coaxial therewith,
j. an exhaust heat inlet in said jacket,
k. said exhaust heat inlet coaxial with said jacket and said vaporization chamber, and
m. proximate the hot end of the vaporization chamber,
n. a flexible pipe connecting the exhaust manifold to the exhaust heat inlet,
o. an exhaust outlet in said jacket,
p. said exhaust outlet from the jacket being radially therefrom and near the inlet end of the vaporization chamber,
q. a flexible pipe connected to the exhaust outlet,
r. a liquid drain from the vaporization chamber near the hot end thereof extending radially from a low point of the vaporization chamber,
s. a fuel reservoir,
t. a tube connecting the fuel drain to the fuel reservoir,
u. a cylindrical vapor outlet extending tangentially on one side of the vaporization chamber,
v. said vapor outlet connected to a cap,
w. said cap attached to the carburetor of the engine in lieu of an air filter,
x. the axis of the vapor outlet above the axis of the vaporization chamber, and
y. an air intake entering tangentially into the vaporization chamber on the other side thereof from the vapor outlet,
z. said air intake having an axis below the axis of the vaporization chamber,
aa. said air intake closer to the hot end of the vaporization chamber than the inlet end, and
bb. said vapor outlet being closer to the inlet end of the vaporization chamber than the hot end.

15. The invention as defined in claim 14 with additional limitations of
   cc. a tee in the conduit from the fuel pump,
   dd. a vaporizer valve in the conduit from the tee to the vaporizer, and
   ee. a conduit from the tee to the carburetor with a carburetor valve therein.

16. The method of vaporizing liquid fuel and mixing the vaporized liquid fuel with air, comprising:
   a. axially introducing the fuel into a cylindrical vaporization chamber,
   b. impinging the liquid fuel toward a hot end plate of the cylindrical chamber,
   c. introducing air having a tangential flow in a first direction near the hot end plate and
   d. removing the mixed fuel vapors and air by a tangential outlet having a flow in a second direction near the fuel inlet, whereby
   e. there is a cross flow of the intake air and mixed vapor as well as the air having a cross flow with respect to the fuel.

17. The invention as defined in claim 16 with an additional limitation of
   f. draining unvaporized fuel from the bottom of the vaporization chamber.

* * * * *